United States Patent [19]
Szala et al.

[11] 3,799,069
[45] Mar. 26, 1974

[54] AUTOMOBILE WHEEL CHOCK

[75] Inventors: Norman M. Szala, Hammond, Ind.;
Thomas J. O'Neill, Evergreen Park;
Robert J. Kunst, Chicago, both of Ill.

[73] Assignee: Pullman Incorporated, Chicago, Ill.

[22] Filed: Sept. 8, 1972

[21] Appl. No.: 287,379

[52] U.S. Cl.... 105/368 R, 105/368 WC, 105/369 C
[51] Int. Cl........................... B60p 7/16, B61d 45/00
[58] Field of Search ........ 105/368 R, 368 C, 369 B; 296/1 A; 214/42; 188/32

[56] References Cited
UNITED STATES PATENTS
2,004,439   6/1935   Judd................................ 105/368 R
3,063,387   11/1962   Schroeder et al.............. 105/369 B Primary Examiner—Drayton E. Hoffman
Attorney, Agent, or Firm—Hilmond O. Vogel

[57] ABSTRACT

An automobile restraining device comprising transversely extending bar means including a number of hold down finger portions insertable in perforated openings of longitudinally extending wheel guide rails to thereby form a fixed restraining member about a wheel of the transported automobile.

2 Claims, 4 Drawing Figures

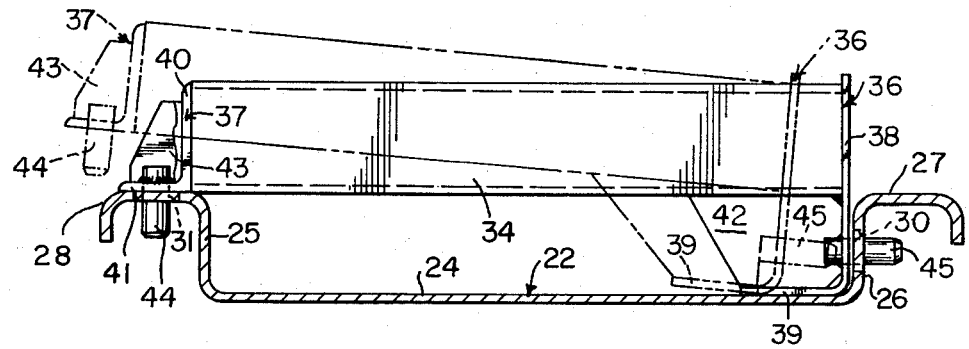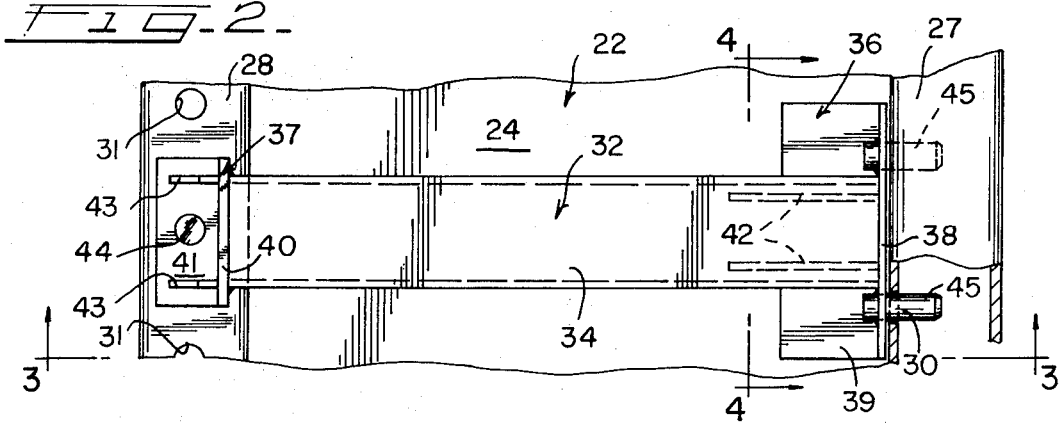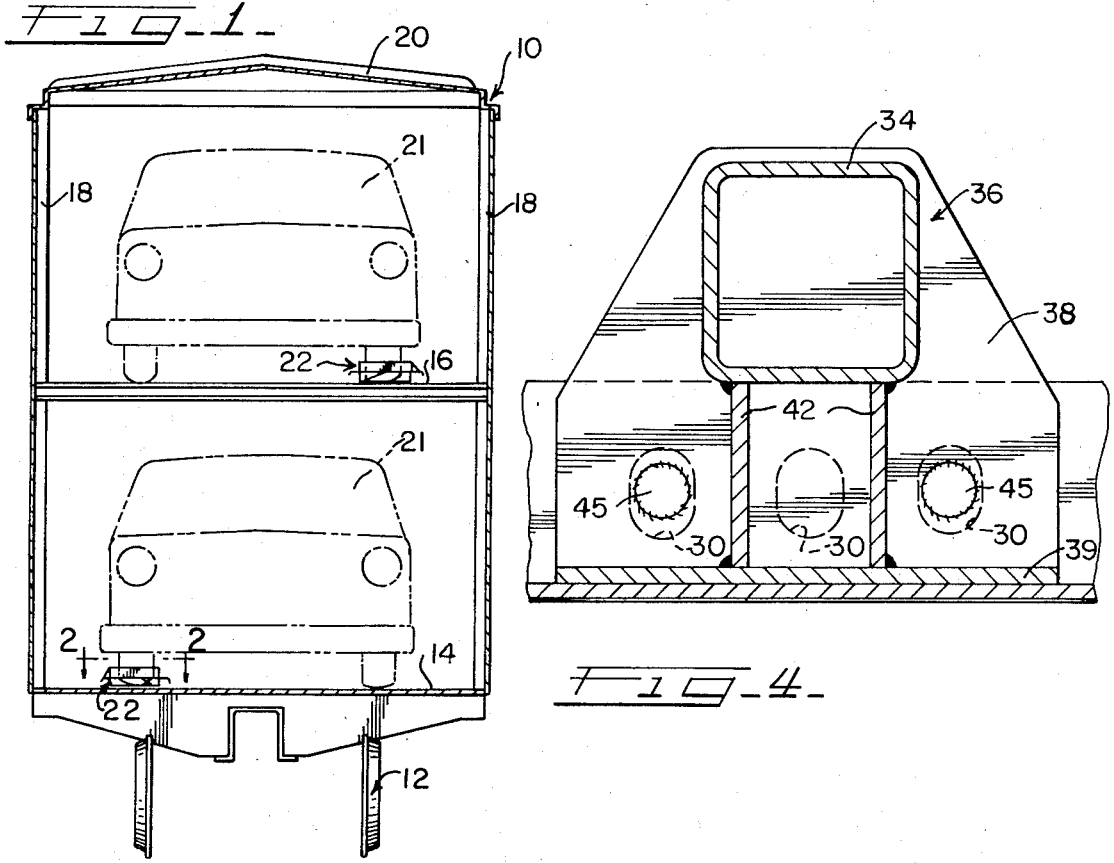

AUTOMOBILE WHEEL CHOCK

BACKGROUND OF THE INVENTION

1. Field of the Invention

This invention relates to automobile wheel chocks and in particular to the portable kind used on railway auto carrying cars.

2. Description of the Prior Art

Prior art automobile restraining devices generally include heavy duty steel chains hooked onto a portion of the automobile underframe and onto an associated hold down member on the deck of the railway vehicle. Hold down devices which engage wheels generally have been rather large and cumbersome thereby presenting a problem with storage and interference during movement of the automobiles from the railway vehicle. The present invention provides a lightweight portable and easily positioned and removed wheel engaging chock which securely and reliably restrains the wheels of an automobile in position on the railway car.

SUMMARY

This invention pertains to an automobile hold down device for use on a railway vehicle. The operative features of the device are aimed at providing a transversely extending bar member which is receivable by an automobile rub rail or guide rail positioned on the deck of the railway vehicle to guide the automobile in its movement thereon. The wheel chock includes a plurality of pin means including transversely extending pin means to engage a portion of the guide rail and including vertically extending pin means to engage a second opening in the guide rail and thereby fit securely into the guide rail.

It is therefore an object of the present invention to provide a simple lightweight and reliable automobile hold down device which is easily moved into position and removed from locking engagement with the automobile wheels.

It is another object of the present invention to provide a wheel chock arrangement for restraining automobiles on the deck of a railway vehicle by providing a guide trough on the deck of the vehicle and having a plurality of openings which receive associated locking pin means on the guide chock bar to thereby lock transported automobiles into position.

These and other objects of the invention will become apparent from reference to the following description, attached drawings and appended claims.

BRIEF DESCRIPTION OF THE DRAWINGS

FIG. 1 is a cross sectional view of a railway auto carrying car;

FIG. 2 is an enlarged top view taken generally along lines 2—2 of FIG. 1 and showing the chock device in a top plan view;

FIG. 3 is a sectional view taken generally along lines 3—3 of FIG. 2 and showing the locking bar prior to and upon complete insertion into the guide trough; and FIG. 4 is a cross sectional view taken generally along lines 4—4 of FIG. 2.

DESCRIPTION OF THE PREFERRED EMBODIMENT

The cross sectional view illustrated in FIG. 1 discloses the general arrangement of the automobile carrying car 10 which is a generally rectangular box car type of structure supported on wheel trucks 12. A lower deck 14 and a vertically spaced upper deck 16 extend between the spaced side wall units 18. A roof structure designated by the numeral 20 may be of the standard type of gradually sloped construction to close off the top portion of the auto carrying car 10 and combine with the side wall units to provide a completely enclosed vehicle which will protect the transported automobiles from debris and vandalism during transport. The automobiles are shown in phantom and designated by the numeral 21 to show the relative positions of each car during movement onto and storage within the auto carrying car 10.

Guide troughs 22 are positioned on both the lower deck 14 and the upper deck 16, and utilized to guide the vehicles during movement into and between adjacent auto carrying cars 10. As noticed, only one guide trough is positioned on each level to thereby guide only a pair of wheels on one side of the automobile to allow for the varying widths of automobiles which may be transported.

As shown in FIG. 3, the guide trough 22 is an inverted hat shaped member having a bottom 24 and laterally spaced sides 25 and 26. Extending outwardly from the sides are the top portions 27, and 28. A plurality of spaced openings 30 are contained in the side 26. Also, a plurality of associated openings are in the top portion 28 as best illustrated in FIG. 2.

A chock or restraining bar 32 is the primary holding member which engages the wheels of the transported vehicle and securely maintains the wheels and automobile in position during transport. The bar 32 includes a main body portion 34 which may be a square or generally rectangular hollow portion as shown in FIG. 4 having sufficient strength to resist buffing from the automobile wheels. An L-shaped end support heel member 36 is fixedly attached to one end of the body portion 34 and a second L-shaped support heel member 37 is positioned at the other end of the chock body 34. Support member 36 includes a generally vertically extending leg portion 38 having a lower or inwardly extending foot portion 39. The support plate 37 also includes a generally vertically extending leg 40 having a generally horizontally and outwardly extending foot portion 41 extending therefrom and in the same plane with the bottom of the body portion 34. Reinforcing gusset plates 42 connect the foot portion 39 and the body portion 34 of the chock 32. Likewise, gusset plates 43 are positioned to extend between the vertical leg portion 40 and the bottom or foot portion 41 of the support plate 37. Vertically extending locking fingers or pegs 44 extend downwardly from the foot portion 41 of the L-shaped support member 37. Generally horizontally extending fingers or pegs 45 are welded to the lower portion of the leg 38 and positioned to extend into and through the associated perforations 30 in the trough side 26.

Thus it is noticed that to position the restraining chock into position an operator simply slides the bar 34 across the bottom surface 24 of the trough 22 until the horizontally extending pegs 45 are received by an associated opening 30 in the side wall 26 at which time the chock is then pivoted downwardly causing the vertically extending locking fingers 44 to be moved into an associated opening 31 in the top plate portion 28. This locking position is illustrated in FIG. 2 and FIG. 3 which show the locking chock 32 received in the trough 22 in such a manner as to securely restrain the automobile being transported. When an automobile is positioned for tie down with the chock bar of the present invention, the automobile may be held in place by a pair of restraining bars 32 surrounding a single wheel. If it is not convenient to securely insert a pair of these restraining bars about a single wheel, one of the restraining bars may be inserted ahead of a front wheel and one behind a rear wheel or conversely inserted behind a front wheel and ahead of the rear wheel where it is more convenient than surrounding a single wheel with a pair of restraining bars.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A wheel chock for restraining an automobile, the improvement comprising:
    a wheel guide trough having a pair of spaced wall portions for directing movement of said automobile and having a bottom automobile supporting wall connecting said spaced wall portions;
    said spaced wall portions including a first wall portion including a horizontally extending portion with a plurality of spaced locking openings contained therein;
    said spaced wall portions also including a first vertically extending side wall containing a plurality of spaced openings;
    a chock bar having a wheel engaging portion spaced above and across said guide trough;
    an end support member mounting the wheel chock on the guide trough bottom wall thereby providing for sliding movement of the wheel chock across said bottom wall of the wheel guide trough;
    horizontally extending locking pin means mounted in said end support member insertable within an associated spaced opening of said first vertically extending side wall; and,
    vertically extending locking pin means insertable into an associated spaced locking opening of the horizontally extending portion of the first wall portion to thereby restrain movement of said automobile.

2. A wheel chock device for use in a railway auto-carrying vehicle having an auto carrying deck and a wheel guide trough positioned to guide automobiles during movement thereon, the improvement comprising:
    a bottom wheel supporting wall portion on said guide trough and having a vertically extending guide wall;
    said guide wall including a plurality of spaced horizontal locking holes;
    said guide trough having a horizontally extending wall portion positioned above said bottom support wall and having a side wall portion extending between the horizontally extending wall portion and the bottom support wall thereby forming a second wheel guide wall;
    said horizontally extending wall portion being laterally spaced from said second guide wall and having a plurality of longitudinally spaced vertical locking openings;
    a wheel engaging chock member having a restraining bar portion extending above and between said vertically extending first and second wheel guide walls;
    an end support member on said chock member;
    said end support member supporting the chock in sliding relation on said guide trough bottom wall portion;
    horizontally extending peg means on said end support member slidable therewith into said horizontal locking holes; and,
    said wheel chock also including vertically extending locking peg means receivable in the vertical locking openings to thereby fixedly position said chock member across the guide trough to prevent movement of said automobile.

* * * * *